(12) United States Patent
Shiotani et al.

(10) Patent No.: US 9,180,414 B2
(45) Date of Patent: Nov. 10, 2015

(54) FLUOROPOLYMER, PRODUCTION METHOD FOR FLUOROPOLYMER, AND POROUS POLYMER FILM

(75) Inventors: Yuko Shiotani, Settsu (JP); Yoshito Tanaka, Settsu (JP); Jun Miki, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 135 days.

(21) Appl. No.: 14/128,192

(22) PCT Filed: Jun. 20, 2012

(86) PCT No.: PCT/JP2012/065773
§ 371 (c)(1),
(2), (4) Date: Dec. 20, 2013

(87) PCT Pub. No.: WO2012/176815
PCT Pub. Date: Dec. 27, 2012

(65) Prior Publication Data
US 2014/0142209 A1  May 22, 2014

(30) Foreign Application Priority Data

Jun. 22, 2011 (JP) ................................ 2011-138571
Jan. 13, 2012 (JP) ................................ 2012-005120
Jan. 13, 2012 (JP) ................................ 2012-005121

(51) Int. Cl.
| | | |
|---|---|---|
| *C08F 214/26* | (2006.01) | |
| *C08F 214/22* | (2006.01) | |
| *B01D 71/36* | (2006.01) | |
| *C08J 9/00* | (2006.01) | |
| *B01D 71/32* | (2006.01) | |
| *B01D 71/34* | (2006.01) | |
| *B01D 69/08* | (2006.01) | |
| *C08G 61/12* | (2006.01) | |
| *C08F 8/26* | (2006.01) | |
| *C08J 9/28* | (2006.01) | |

(52) U.S. Cl.
CPC ............... *B01D 71/36* (2013.01); *B01D 69/08* (2013.01); *B01D 71/32* (2013.01); *B01D 71/34* (2013.01); *C08F 8/26* (2013.01); *C08F 214/22* (2013.01); *C08G 61/121* (2013.01); *C08J 9/28* (2013.01); *B01D 2325/36* (2013.01); *C08F 214/26* (2013.01); *C08J 2201/0544* (2013.01); *C08J 2327/14* (2013.01); *C08J 2327/18* (2013.01)

(58) Field of Classification Search
None
See application file for complete search history.

(56) References Cited

U.S. PATENT DOCUMENTS

| | | | |
|---|---|---|---|
| 4,384,047 A | 5/1983 | Benzinger et al. | |
| 4,623,670 A | 11/1986 | Mutoh et al. | |
| 4,919,810 A | 4/1990 | Itoh et al. | |
| 5,070,162 A | 12/1991 | Oxenrider et al. | |
| 5,282,965 A | 2/1994 | Urairi et al. | |
| 5,988,400 A | 11/1999 | Karachevteev et al. | |
| 6,051,682 A * | 4/2000 | Debrabander et al. | 528/501 |
| 6,329,471 B1 | 12/2001 | Mizuide et al. | |
| 7,182,870 B2 | 2/2007 | Minegishi et al. | |
| 2003/0094409 A1 | 5/2003 | Minegishi et al. | |
| 2003/0232184 A1 | 12/2003 | Morikawa et al. | |
| 2005/0258101 A1 | 11/2005 | Minegishi et al. | |
| 2008/0078718 A1 | 4/2008 | Tada et al. | |
| 2008/0156722 A1 | 7/2008 | Suzuki et al. | |
| 2009/0039014 A1 | 2/2009 | Katsurao et al. | |
| 2009/0061280 A1 * | 3/2009 | Ino et al. | 429/33 |
| 2009/0297822 A1 | 12/2009 | Fujimura et al. | |
| 2011/0020728 A1* | 1/2011 | Kita et al. | 429/483 |
| 2014/0138304 A1 | 5/2014 | Shiotani et al. | |

FOREIGN PATENT DOCUMENTS

| | | |
|---|---|---|
| CN | 1972737 A | 5/2007 |
| CN | 1980729 A | 6/2007 |
| CN | 101227967 A | 7/2008 |
| JP | 56-152851 A | 11/1981 |
| JP | 58-93734 A | 6/1983 |
| JP | 58-98105 A | 6/1983 |
| JP | 58-142905 A | 8/1983 |
| JP | 60-209205 A | 10/1985 |
| JP | 61-4504 A | 1/1986 |
| JP | 63-11370 B2 | 3/1988 |
| JP | 63-248405 A | 10/1988 |
| JP | 63-248406 A | 10/1988 |
| JP | 01-247448 A | 10/1989 |
| JP | 02-502832 A | 9/1990 |
| JP | 3-38227 A | 2/1991 |
| JP | 3-38228 A | 2/1991 |
| JP | 03-66714 A | 3/1991 |
| JP | 4-94724 A | 3/1992 |

(Continued)

OTHER PUBLICATIONS

Extended European Search Report dated Nov. 24, 2014, issued by the European Patent Office in related European Application No. 12802577.2.

(Continued)

*Primary Examiner* — Kara Boyle
(74) *Attorney, Agent, or Firm* — Sughrue Mion, PLLC

(57) ABSTRACT

A fluoropolymer including a vinylidene fluoride unit, a tetrafluoroethylene unit, and a unit represented by the following formula (1):

$$-CHX^1-CX^2(OR)- \quad (1)$$

wherein one of $X^1$ and $X^2$ is a hydrogen atom, and the other is a fluorine atom; and R is a hydrogen atom or a $C_1$-$C_8$ alkyl group.

8 Claims, No Drawings

(56) References Cited

FOREIGN PATENT DOCUMENTS

| | | |
|---|---|---|
| JP | 10-512194 A | 11/1998 |
| JP | 11-269225 A | 10/1999 |
| JP | 2003-138422 A | 5/2003 |
| JP | 2003-236351 A | 8/2003 |
| JP | 2005-522316 A | 7/2005 |
| JP | 2007-167839 A | 7/2007 |
| JP | 2009-203584 A | 9/2009 |
| WO | 92/09357 A1 | 6/1992 |
| WO | 03/031038 A1 | 4/2003 |
| WO | 03/086595 A1 | 10/2003 |
| WO | 03/106545 A1 | 12/2003 |

OTHER PUBLICATIONS

International Search Report mailed Aug. 28, 2012 for PCT/JP2012/065773.
International Search Report mailed Aug. 21, 2012 for PCT/JP2012/065761.
International Preliminary Report on Patentability and Written Opinion of the International Searching Authority issued Dec. 23, 2013 for PCT/JP2012/065761.
International Preliminary Report on Patentability and Written Opinion of the International Searching Authority issued Dec. 23, 2013 for PCT/JP2012/065773.

* cited by examiner

FLUOROPOLYMER, PRODUCTION METHOD FOR FLUOROPOLYMER, AND POROUS POLYMER FILM

CROSS REFERENCE TO RELATED APPLICATIONS

This application is a National Stage of International Application No. PCT/JP2012/065773, filed Jun. 20, 2012, claiming priority based on Japanese Patent Application Nos. 2011-138571, filed Jun. 22, 2011 and JP 2012-005120 and JP 2012-005121, filed Jan. 13, 2012, the contents of all of which are incorporated herein by reference in their entirety.

TECHNICAL FIELD

The present invention relates to a novel fluoropolymer, a method of producing the fluoropolymer, and a porous polymer membrane.

BACKGROUND ART

Porous membranes have recently been utilized in various fields, including not only for treatment of water (e.g. water purification, waste water treatment), medical usage (e.g. blood purification), and the food industry, but also for use as charged membranes, battery separators, and fuel cells.

For example, porous membranes are used in the field of water treatment such as water purification and waste water treatment for substitution for conventional purposes, including sand filtration and coagulative precipitation, and improvement in the quality of treated water. Since a large quantity of water is treated in the field of water treatment, porous membranes are required to have excellent hydrophilicity. Porous membranes with excellent hydrophilicity enable to reduce the area of the membranes, which in turn reduces the size of water purification apparatuses. Accordingly, facility costs can be reduced. Moreover, membranes with hydrophilicity are less likely to be stained. Thus, such membranes can stably maintain the filtration performance for a long period of time, and can reduce the frequency of cleaning the membranes.

Furthermore, porous membranes are required to have chemical resistance because they may be washed with an alkaline solution in chemical cleaning. Studies have been made on porous membranes that contain a fluoropolymer (e.g. polyvinylidene fluoride resin) as a material with high chemical resistance (see, for example, Patent Literatures 1 to 14). However, conventional fluoropolymers have insufficient hydrophilicity or mechanical strength, and thus need improvement as a material for porous polymer membranes.

CITATION LIST

Patent Literature
  Patent Literature 1 JP-A 2009-203584
  Patent Literature 2 JP-T 10-512194
  Patent Literature 3 JP-A 63-248405
  Patent Literature 4 JP-A 63-248406
  Patent Literature 5 JP-A 58-98105
  Patent Literature 6 WO 2003/106545
  Patent Literature 7 JP-A 2003-138422
  Patent Literature 8 JP-A 2003-236351
  Patent Literature 9 JP-A 3-38228
  Patent Literature 10 JP-A 3-38227
  Patent Literature 11 JP-T 2005-522316
  Patent Literature 12 JP-A 61-4504
  Patent Literature 13 JP-B 63-11370
  Patent Literature 14 JP-A 2007-167839

SUMMARY OF INVENTION

Technical Problem

The present invention provides a novel fluoropolymer that is excellent not only in hydrophilicity but also in mechanical strength, and a method of producing the fluoropolymer. The present invention also provides a porous polymer membrane that includes the fluoropolymer.

Solution to Problem

The present invention relates to a fluoropolymer that includes a vinylidene fluoride unit, a tetrafluoroethylene unit, and a unit represented by the following formula (1):

$$-CHX^1-CX^2(OR)- \quad (1)$$

wherein one of $X^1$ and $X^2$ is a hydrogen atom, and the other is a fluorine atom; and R is a hydrogen atom or a $C_1$-$C_8$ alkyl group.

In the fluoropolymer of the present invention, the R in the formula (1) is preferably a hydrogen atom, a methyl group, or an ethyl group.

The fluoropolymer of the present invention preferably has a surface that has a ratio of oxygen/fluorine content (O/F) on the surface of not less than 0.050 but less than 0.150 when measured by X-ray photoelectron spectroscopy (XPS). Moreover, the fluoropolymer of the present invention preferably has a surface that has a (C—F/C—H) ratio representing a ratio of C—F bonds to C—H bonds on the surface of larger than 0.50 when measured by X-ray photoelectron spectroscopy (XPS).

The method of producing a fluoropolymer of the present invention is a method of producing the aforementioned fluoropolymer. The method includes a step of treating a fluoropolymer that includes a vinylidene fluoride unit and a tetrafluoroethylene unit with an alkali in the presence of water and/or a $C_1$-$C_8$ alcohol.

In the method of producing the fluoropolymer according to the present invention, the alcohol is preferably ethanol or methanol.

In the method of producing the fluoropolymer according to the present invention, the fluoropolymer includes the vinylidene fluoride unit and the tetrafluoroethylene unit preferably in a molar ratio of the vinylidene fluoride unit/tetrafluoroethylene unit of 50 to 90/50 to 10.

A porous polymer membrane according to the present invention includes the fluoropolymer of the present invention.

Advantageous Effects of Invention

The fluoropolymer of the present invention is a novel fluoropolymer that includes specific structural units. The fluoropolymer is excellent not only in hydrophilicity but also in mechanical strength. Thus, the fluoropolymer is suitably used as a material for porous polymer membranes.

The method of producing the fluoropolymer according to the present invention enables to favorably produce the fluoropolymer of the present invention that includes specific structural units.

The porous polymer membrane of the present invention includes the fluoropolymer of the present invention, and thus can be suitably used as a porous polymer membrane for various purposes of use.

DESCRIPTION OF EMBODIMENTS

The following describes the present invention in detail.

The fluoropolymer of the present invention (hereinafter, also referred to as a fluoropolymer (A)) includes a vinylidene fluoride unit, a tetrafluoroethylene unit, and a unit (hereinafter, also referred to as a formula (1) unit) represented by the following formula (1):

$$—CHX^1—CX^2(OR)— \quad (1)$$

wherein one of $X^1$ and $X^2$ is a hydrogen atom, and the other is a fluorine atom; and R is a hydrogen atom or a $C_1$-$C_8$ alkyl group.

The fluoropolymer (A) includes a vinylidene fluoride unit (VdF unit), a tetrafluoroethylene unit (TFE unit), and a unit represented by the above formula (1).

The fluoropolymer (A) is novel in that it includes the formula (1) unit as a copolymer unit in addition to a vinylidene fluoride unit (VdF unit) and a tetrafluoroethylene unit (TFE unit). The fluoropolymer (A) is a fluorocopolymer having at least three monomer units.

The fluoropolymer (A) is excellent in hydrophilicity due to the hydroxyl group and/or alkoxy group contained as functional group(s) in the formula (1) unit.

In the fluoropolymer (A), the R in the formula (1) may be any of a hydrogen atom and a $C_1$-$C_8$ alkyl group, but is preferably a methyl group or an ethyl group. In this case, the fluoropolymer (A) has a greater hydrophilicity.

If the fluoropolymer (A) has a plurality of the formula (1) units, Rs in the respective units may be the same as or different from one another.

Preferably, the fluoropolymer (A) has a surface that has a ratio of oxygen/fluorine content (O/F) on the surface of not less than 0.050 but less than 0.150 when measured by X-ray photoelectron spectroscopy (XPS).

A (O/F) ratio of 0.150 or higher reduces the mechanical strength of the fluoropolymer (A), whereas a (O/F) ratio of lower than 0.150 enables to achieve excellent mechanical strength.

If the (O/F) ratio is lower than 0.050, the amount of the formula (1) unit is small, and the fluoropolymer (A) may have low hydrophilicity.

For measurement of the surface of the fluoropolymer (A) by X-ray photoelectron spectroscopy (XPS), the sample for the measurement may be the fluoropolymer (A) as it is or a porous polymer membrane formed from the fluoropolymer (A).

The (O/F) ratio can be calculated from values obtained by X-ray photoelectron spectroscopy (XPS) based on the following expression.

$$(O/F) \text{ ratio}=A/B$$

A: Value of the peak area of oxygen atom
B: Value of the peak area of fluorine atom The fluoropolymer (A) has a surface that has a (C—F/C—H) ratio representing a ratio of C—F bonds to C—H bonds on the surface of preferably larger than 0.50 and more preferably larger than 0.65 when measured by X-ray photoelectron spectroscopy (XPS).

If the (C—F/C—H) ratio is 0.50 or lower, the fluoropolymer (A) has lower mechanical strength. Moreover, it may be colored dark brown.

The upper limit of the (C—F/C—H) ratio is preferably 2.0, and more preferably 1.4. A larger (C—F/C—H) ratio leads to a higher hydrophobicity of the fluoropolymer (A). If the (C—F/C—H) ratio is larger than 2.0, the hydrophobicity may be more prominent.

The (C—F/C—H) ratio can be calculated from values obtained by X-ray photoelectron spectroscopy (XPS) based on the following expression.

$$(C—F/C—H) \text{ ratio}=a/b$$

a: Value of the peak area of the interatomic bonding energy (292.4 eV) derived from C—F bonds
b: Value of the peak area of the interatomic bonding energy (286.0 eV and 287.8 eV) derived from C—H bonds In a surface of the fluoropolymer (A), a C—O bond content in a total of C—C bonds and bonds between C and an atom other than C is preferably not less than 0.80 mol %, and more preferably not less than 1.50 mol % when measured by X-ray photoelectron spectroscopy (XPS).

A high C—O bond content in a total of C—C bonds and bonds between C and an atom other than C enables to produce a fluoropolymer having excellent hydrophilicity.

A higher C—O bond content in a total of C—C bonds and bonds between C and an atom other than C supposedly indicates a larger proportion of the formula (1) unit in the fluoropolymer (A). For example, if the C—O bond content is not less than 0.80 mol %, the fluoropolymer (A) is considered to have the formula (1) unit.

The C—O bond content in a total of C—C bonds and bonds between C and an atom other than C is preferably not more than 10.0 mol % as this enables the fluoropolymer (A) to have excellent mechanical strength.

The C—O bond content in a total of C—C bonds and bonds between C and an atom other than C can be calculated from values obtained by X-ray photoelectron spectroscopy (XPS) based on the following expression.

C—O bond content in a total of C—C bonds and bonds between C and an atom other than C=$\alpha/\beta$ $\alpha$: Value of the peak area of the interatomic bonding energy (290.1 eV) derived from C—O bonds
$\beta$: Value of the peak area of a total of the interatomic bonding energy (280.0 to 300.0 eV) derived from C—C bonds and bonds between C and an atom other than C The fluoropolymer may be a copolymer consisting of a VdF unit, a TFE unit, and a formula (1) unit, or may contain other structural unit(s) as long as the properties are maintained. Examples of other structural unit(s) include a hexafluoropropylene unit, a chlorotrifluoroethylene unit, a perfluorovinyl ether unit, and an ethylene unit.

In the fluoropolymer (A), the molar ratio of the VdF unit, TFE unit, and formula (1) unit (VdF unit/TFE unit/formula (1) unit) is preferably 30 to 84.9/10 to 50/0.1 to 20.

In this case, the fluoropolymer (A) achieves excellent hydrophilicity and excellent mechanical strength at high levels.

The structure of the fluoropolymer (A) can be identified by NMR or IR.

The fluoropolymer (A) may have any weight average molecular weight, but preferably has not less than 10000 when it is used as a material for porous polymer membranes in terms of the mechanical strength and membrane forming property. The weight average molecular weight is more preferably 50000 to 1000000, and still more preferably 100000 to 800000.

The weight average molecular weight can be determined by gel permeation chromatography (GPC).

The hydrophilicity of the fluoropolymer (A) can be evaluated by measuring the static water contact angle on the surface of a thin membrane or porous membrane made of a solution of the fluoropolymer (A) in a solvent.

If the static water contact angle is not larger than 90° on a sufficiently dried surface of a porous fluoropolymer (A) membrane that has an average pore size of 0.01 to 0.1 μm in its outermost surface, the fluoropolymer (A) has high hydrophilicity. Thus, it is preferably used as a material for membranes, especially as a material for porous membranes for treating water.

The hydrophilicity of the fluoropolymer (A) can also be evaluated by measuring the water permeability of a porous membrane made of the fluoropolymer (A). The pure water permeability coefficient of the porous membrane is preferably $1.0 \times 10^{-10}$ m$^3$/m$^2$/s/Pa or higher, and more preferably $2.0 \times 10^{-10}$ m$^3$/m$^2$/s/Pa or higher. A higher pure water permeability coefficient indicates a higher hydrophilicity, and the maximum value thereof is not particularly limited. The higher the value, the better, as long as the desired permeability and strength are maintained.

For determination of the pure water permeability coefficient, deionized water is pressurized at not lower than 0.01 MPa with nitrogen at a temperature of 25° C. to allow the water to be permeated through a produced porous polymer membrane. Concretely, the pure water permeability coefficient is determined based on the following expression.

Pure water permeability coefficient=(Amount of permeated water)/(Membrane area)/(Permeation time)/(Evaluation pressure)

The mechanical strength of the fluoropolymer (A) can be evaluated by measuring the tensile strength of a porous hollow fiber membrane made of the fluoropolymer (A). Concretely, the mechanical strength can be evaluated referring to the maximum breaking strength or maximum point elongation as an index.

For example, in the case of a porous hollow fiber membrane having an aforementioned preferable pure water permeability coefficient that is prepared from a solution having a polymer concentration of 18% by weight by a conventional non-solvent induced phase separation method, the maximum breaking strength is preferably not lower than 1.0 MPa, and more preferably not lower than 2.0 MPa.

The maximum point breaking strength is determined by measuring the breaking strength of a sample piece under conditions of a distance between chucks of 50 mm and a tension speed of 200 mm/min., where the sectional area of the sample piece before the tensile test is set as a unit measurement area.

The maximum point elongation of, for example, the porous hollow fiber membrane produced as mentioned above is preferably not less than 120%, and more preferably not less than 150%.

The maximum point elongation is determined by measuring the elongation at break of a sample piece under conditions of a distance between chucks of 50 mm and a tension speed of 200 mm/min., and calculating the elongation rate at the maximum point based on the distance between chucks of 50 mm.

The fluoropolymer (A) of the present invention is suitably used as a material for porous polymer membranes.

Examples of the porous polymer membranes containing the fluoropolymer (A) include flat membranes and hollow fiber membranes.

Moreover, the porous polymer membranes containing the fluoropolymer (A) are suitable for use as microfiltration membranes or ultrafiltration membranes for treating water in production of drinking water, water purification treatment, and waste water treatment. Moreover, in the field of ultra-pure water production, the porous polymer membrane of the present invention may be used as a charged porous membrane which increases ion exclusion performance to provide pure water with a higher purity. The fluoropolymer (A) of the present invention has a high hydrophilicity, and is thus particularly suitable for porous polymer membranes for treating water.

Moreover, the porous polymer membrane can be favorably used in such fields as the medical, food, and battery fields.

In the medical field, the porous polymer membrane can be used for blood purification, more specifically, as a membrane for blood purification to remove waste in blood by an extracorporal circulation, such as blood dialysis, blood filtration, and blood diafiltration, which replaces kidney function.

In the food field, the porous polymer membrane can be used for separation and removal of yeasts after fermentation, or for enrichment of liquid.

In the battery field, the porous polymer membrane can be used as a separator for batteries to allow an electrolyte to pass therethrough but retains battery reaction products, or as a base material for polymer solid electrolytes.

The following describes the method of producing the fluoropolymer according to the present invention.

The method of producing the fluoropolymer according to the present invention is a method of producing the fluoropolymer (A). The method includes a step of treating a fluoropolymer that includes a vinylidene fluoride unit and a tetrafluoroethylene unit (hereinafter, also referred to as a fluoropolymer (A')) with an alkali in the presence of water and/or a $C_1$-$C_8$ alcohol.

The method of the present invention enables to favorably produce the fluoropolymer (A) of the present invention. The fluoropolymer (A) of the present invention is preferably one produced by the aforementioned method.

(1) First, a fluoropolymer (A') that includes a vinylidene fluoride unit and a tetrafluoroethylene unit is explained.

The fluoropolymer (A') can be produced by conventionally known methods. For example, the fluoropolymer (A') can be produced by polymerization, such as solution polymerization, bulk polymerization, emulsion polymerization, or suspension polymerization. Preferably, it is produced by emulsion polymerization or suspension polymerization for an easier industrial implementation.

Polymerization initiators, surfactants, chain transfer agents, and solvents, including conventionally known ones, may be used in the polymerization.

The solvent may be appropriately selected depending on the type of the polymerization. Examples thereof include water, a mixed solvent of water and alcohol, and a fluorine-containing solvent.

Examples of the polymerization initiators include oil-soluble radical polymerization initiators and water-soluble radical polymerization initiators.

The surfactants may be known surfactants. For example, nonionic surfactants, anionic surfactants, and cationic surfactants may be used. Fluorine-containing anionic surfactants are preferable, and $C_4$-$C_{20}$ linear or branched fluorine-containing anionic surfactants that contain an ether-bonding oxygen atom (i.e., an oxygen atom may exist between carbon atoms) are more preferable.

Examples of the chain transfer agents include hydrocarbons, such as ethane, isopentane, n-hexane or cyclohexane; aromatic compounds, such as toluene or xylene; ketones such as acetone; acetic esters such as ethylacetate or butyl acetate; alcohols, such as methanol or ethanol; mercaptanes, such as methyl mercaptane; and halogenated hydrocarbons, such as carbon tetrachloride, chloroform, methylene chloride, or methyl chloride. The amount of the chain transfer agent to be added may vary depending on the chain transfer constant of the compound; however, the amount is normally in a range of 0.001 to 10% by mass relative to the amount of the polymerization solvent.

The polymerization temperature is any temperature and may be 0 to 100° C. The polymerization pressure is appropriately determined depending on other polymerization conditions, such as the kind, amount, and vapor pressure of the solvent to be used, or polymerization temperature; however, it may normally be 0 to 9.8 MPaG.

The fluoropolymer (A') can be produced by the aforementioned methods. The fluoropolymer (A') may be any commercially available product according to the production method of the present invention.

Examples of the commercially available fluoropolymer (A') include NEOFLON VT50, VP50, VT100, VP100, VP101 and VP100x produced by Daikin Industries, Ltd.

The molar ratio of the vinylidene fluoride unit/tetrafluoroethylene unit in the fluoropolymer (A') is not particularly limited, and may be appropriately determined depending on the structural ratio (VdF unit/TFE unit/formula (1) unit) of the units in a fluoropolymer (A) to be produced through the subsequent steps. Preferably, the molar ratio is 50 to 90/50 to 10.

The reason is as follows. Too small a VdF unit content reduces the reactivity in an alkali treatment step mentioned below, and not less than 10% the TFE unit leads to moderate degrees of defluorination and alcohol-addition reaction in the alkali treatment step. The above ratio is thus preferable to produce the fluoropolymer (A) having excellent hydrophilicity and mechanical strength.

The fluoropolymer (A') preferably has a surface that has a (C—F/C—H) ratio representing a ratio of C—F bonds to C—H bonds on the surface of not less than 1.2 when measured by X-ray photoelectron spectroscopy (XPS).

Moreover, the fluoropolymer (A') preferably has a ratio of oxygen/fluorine content (O/F) of less than 0.050 (including no detection of oxygen peaks) when measured by X-ray photoelectron spectroscopy (XPS).

(2) The production method according to the present invention includes a step (hereinafter, also referred to as an alkali treatment step) of treating the fluoropolymer (A') with an alkali in the presence of water and/or a $C_1$-$C_8$ alcohol.

The step includes contacting the fluoropolymer (A') with an alkali treatment solution, which is prepared by dissolving a solid or liquid alkali in water and/or a $C_1$-$C_8$ alcohol, by, for example, immersing the fluoropolymer (A') in the alkali treatment solution or applying the alkali treatment solution to the fluoropolymer (A').

Examples of the alkali include alkali metal hydroxides such as sodium hydroxide, and potassium hydroxide; alkaline earth metal hydroxides such as magnesium hydroxide, and calcium hydroxide; alkali metal alkoxides or alkaline earth metal alkoxides; and organic amines such as trimethylamine, and triethylamine.

The alcohol is any $C_1$-$C_8$ alcohol, and may be appropriately determined depending on the structure of the formula (1) unit in a fluoropolymer (A) to be produced. In consideration of the fact that alcohol having a small number of carbon atoms, such as methanol or ethanol, tends to have high reactivity with the fluoropolymer (A'), the alcohol may be determined depending on the reactivity. Two kinds or more alcohols may be used in combination.

The concentration of the alkali in the alkali treatment solution is not particularly limited. For example, in the case where the alkali is sodium hydroxide, a 0.01 to 8N alkali treatment solution may be used.

In the case where the alkali treatment solution contains both water and the alcohol, the volume ratio of water to the alcohol may be optional but is preferably about 30 to 70/70 to 30.

In the case where the fluoropolymer (A') is immersed in the alkali treatment solution in this step, the time period and temperature for the immersion are not particularly limited, and may be appropriately determined depending on the structure of the desired fluoropolymer (A). Normally, the fluoropolymer (A') is immersed in the alkali treatment solution having a temperature of 5 to 70° C. for several minutes to several days.

In the production method of the present invention, the fluoropolymer (A') may be swollen or dissolved in a solvent in the alkali treatment step. The fluoropolymer (A') has a higher reactivity with the alkali solution when it is swollen or dissolved in a solvent.

Examples of the solvent for swelling or dissolving the fluoropolymer (A') include lower alkyl ketones, esters, and amides, such as N-methyl-2-pyrrolidone, dimethyl sulfoxide, dimethylacetamide, dimethylformamide, methyl ethyl ketone, acetone, tetrahydrofuran, tetramethylurea, or trimethyl phosphate; and mixed solvents thereof.

The alkali-treated fluoropolymer (A') is washed with water, or if necessary acidic water, to give a fluoropolymer (A). If the fluoropolymer (A') has been swollen or dissolved in a solvent, the resulting fluoropolymer (A) is preferably purified, if necessary, by reprecipitation or another technique.

In the method of producing the fluoropolymer according to the present invention, through the alkali treatment step, a part of the VdF unit in the fluoropolymer (A') is replaced with the formula (1) unit by the defluorination and subsequent addition of water or alcohol. Thereby, a fluoropolymer (A) can be obtained.

If a vinylidene fluoride unit and a tetrafluoroethylene unit are present in a proper ratio in a fluoropolymer (A'), addition reaction of water or alcohol readily proceeds after the defluorination. Moreover, the addition reaction proceeds faster in the presence of alcohol. Thus, a fluoropolymer (A) produced through the above method has less double bonds caused by the defluorination and maintains the solubility to a solvent. Accordingly, a polymer having mechanical strength and hydrophilicity can be obtained.

In accordance with the method of producing the fluoropolymer of the present invention, the structure (e.g. the molar ratio of a VdF unit, a TFE unit, and a formula (1) unit) of a fluoropolymer (A) to be produced can be controlled by appropriately setting the molar ratio of the VdF unit and the TFE unit in the fluoropolymer (A'), the alkali concentration or composition of the alkali treatment solution, and the time period or temperature for the immersion in the alkali treatment solution.

Hence, the method of producing the fluoropolymer according to the present invention enables to favorably produce the fluoropolymer (A).

The fluoropolymer (A) according to the present invention is suitable as a material for porous polymer membranes as mentioned earlier.

A method of producing porous polymer membranes using the fluoropolymer (A) is briefly described below.

Examples of the method of producing porous polymer membranes using the fluoropolymer (A) include a method of forming a porous polymer membrane from the fluoropolymer (A); and a method of firstly forming a porous polymer membrane from the fluoropolymer (A'), and then subjecting the membrane to a treatment similar to the aforementioned alkali treatment step.

Moreover, a porous membrane formed from the fluoropolymer (A) may be subjected to a treatment similar to the aforementioned alkali treatment step, depending on the intended use.

Examples of the method to form a porous membrane from the fluoropolymer (A or A') include a phase separation method, a melt extraction method, a steam coagulation method, a stretching method, an etching method, a method of sintering a polymer sheet to be formed into a porous membrane, a method of crushing a cellular polymer sheet to form a porous membrane, and a method using electrospinning technique. A phase separation method is preferable among the above because of the ease of pore size control. Examples of the phase separation method include a thermally induced phase separation method (TIPS), and a non-solvent induced phase separation method (NIPS).

Since a non-solvent induced phase separation method allows relatively easy formation of three-dimensional network structures, porous membranes produced through a non-solvent induced phase separation method have a good mechanical strength. Moreover, a non-solvent induced phase separation method is favorably employed for production of asymmetric membranes.

Porous membranes produced through a thermally induced phase separation method tend to be excellent in water permeability due to relatively easy formation of the spherical structures. Moreover, such porous membranes can have a higher mechanical strength by increasing the concentration of the polymer solution during membrane formation.

In the case of forming a porous membrane from the fluoropolymer (A or A'), the above is preferably taken into consideration for choosing the method of forming membranes.

Meanwhile, both a thermally induced phase separation method and a non-solvent induced phase separation method may be performed for forming porous membranes from the fluoropolymer (A or A').

EXAMPLES

The present invention is described in more detail by, but not limited to, examples below.

In the examples, measurements by X-ray photoelectron spectroscopy (XPS) and nuclear magnetic resonance spectroscopy (NMR) were performed under the following conditions.

[Surface Measurement by X-Ray Photoelectron Spectroscopy (XPS)]

A porous membrane was formed from a fluoropolymer. The surface of the membrane was measured by X-ray photoelectron spectroscopy (XPS) in accordance with the following method.

The measurement was performed with ESCA3400 (produced by Shimadzu Corporation) using Mg Kα X-ray source (1253.6 eV). The diameter of the measurement area was about 3 mm, and the detection depth was about 7 nm (photoelectron take-off angle: 90°).

[(C—F/C—H) Ratio]

The (C—F/C—H) ratio was calculated based on an expression below using the values obtained by X-ray photoelectron spectroscopy (XPS).

(C—F/C—H) ratio=$a/b$ a: Value of the peak area of the interatomic bonding energy (292.4 eV) derived from C—F bonds
b: Value of the peak area of the interatomic bonding energy (286.0 eV and 287.8 eV) derived from C—H bonds

[(O/F) Ratio]

The (O/F) ratio was calculated based on an expression below using the values obtained by X-ray photoelectron spectroscopy (XPS).

(O/F) ratio=$A/B$

A: Value of the peak area of oxygen
B: Value of the peak area of fluorine

[C—O Bond Content in a Total of C—C Bonds and Bonds Between C and an Atom Other Than C]

The ratio was calculated based on an expression below using the values obtained by X-ray photoelectron spectroscopy (XPS).

C—O bond content in a total of C—C bonds and bonds between C and an atom other than C=$\alpha/\beta$ α: Value of the peak area of the interatomic bonding energy (290.1 eV) derived from C—O bonds
β: Value of the peak area of a total of the interatomic bonding energy (280.0 to 300.0 eV) derived from C—C bonds and bonds between C and an atom other than C

[Measurement of the Composition of Fluoropolymer by Nuclear Magnetic Resonance Spectroscopy (NMR)]

A JNM-EX270 (270 MHz) spectrometer (produced by JEOL Ltd.) was used for the $^1$H-nuclear magnetic resonance spectroscopy (NMR) measurement. The solvent used was deuterated acetone.

[Static Water Contact Angle on the Surface of Membrane]

A porous membrane having an average pore size of 0.01 to 0.1 μm on the outermost surface was produced. The static contact angle of water (25° C.) on the membrane in sufficiently dried state was measured with DropMaster 701 (produced by Kyowa Interface Science Co., Ltd.) using pure water as a measurement solvent.

[Pure Water Permeability Coefficient]

The pure water permeability coefficient was determined by permeating deionized water through a produced hollow fiber membrane at 25° C. The deionized water was pressurized to not lower than 0.01 MPa with nitrogen gas.

Pure water permeability coefficient [$m^3/m^2/s/Pa$]=(Amount of permeated water)/(Membrane area)/(Permeation time)/(Evaluation pressure)

[Particle Filtration Rate]

Particle size-controlled polystyrene latex particles were dispersed in deionized water (approximately 100 ppm) to prepare an original liquid for evaluation, and the original liquid was permeated. The particle filtration rate was calculated based on the following expression.

Particle filtration rate (%)=((Absorbance of original liquid for evaluation)−(Absorbance of permeated liquid))/(Absorbance of original liquid for evaluation)×100

[Maximum Point Breaking Strength]

The maximum point breaking strength was determined by measuring the breaking strength of a sample piece under conditions of a distance between chucks of 50 mm and a tension speed of 200 mm/min., where the sectional area of the sample piece before the tensile test was set as a unit measurement area.

[Maximum Point Elongation]

The maximum point elongation was determined by measuring the breaking strength of a sample piece under conditions of a distance between chucks of 50 mm and a tension speed of 200 mm/min., and calculating the elongation rate at the maximum point based on the distance between chucks of 50 mm.

Example 1

A vinylidene fluoride-tetrafluoroethylene copolymer (vinylidene fluoride/tetrafluoroethylene=80/20 (molar ratio)) (2.60 g), NaOH (2.78 g), pure water (35 mL), and ethanol (35 mL) were placed in a recovery flask and stirred at room temperature for 17 days.

An alkaline solution was removed by decantation, followed by repetition of washing with pure water until the copolymer was neutralized. The resulting product was dried with a vacuum drier to give a desired fluoropolymer (A).

$^1$H-NMR (deuterated acetone): δ=1.27 (br, —OCH$_2$C$\underline{H}_3$), 2.41 (br, —C$\underline{H}_2$—CF(OR)—), 3.23 (br, —C$\underline{H}_2$—CF$_2$—, —OC$\underline{H}_2$CH$_3$), C$\underline{H}$(OCH$_2$CH$_3$)—CHF—), 3.85 (br, —C$\underline{H}$(OH)—CHF—), 4.14 (br, —CH(OR)—C$\underline{H}$F—) ppm; R=H, CH$_2$CH$_3$.

VdF unit/TFE unit/formula(1) unit=71.9/20.0/8.1 (molar ratio)

Example 2

A vinylidene fluoride-tetrafluoroethylene copolymer (vinylidene fluoride/tetrafluoroethylene=63/37 (molar ratio)) (2.36 g), NaOH (2.76 g), pure water (35 mL), and ethanol (35 mL) were placed in a recovery flask and stirred at room temperature for 9 days.

An alkaline solution was removed by decantation, followed by repetition of washing with pure water until the copolymer was neutralized. The resulting product was dried with a vacuum drier to give a desired fluoropolymer (A).

$^1$H-NMR (deuterated acetone): δ=1.31 (br, —OCH$_2$C$\underline{H}_3$), 2.54 (br, —C$\underline{H}_2$—CF(OR)—), 3.23 (br, —O$\underline{H}$, —C$\underline{H}_2$—CF$_2$—, —OC$\underline{H}_2$CH$_3$, —C$\underline{H}_3$, —C$\underline{H}$(OCH$_2$CH$_3$)—CHF—), 3.92 (br, —C$\underline{H}$(OH)—CHF—), 4.15 (br, —CH(OR)—C$\underline{H}$F—) ppm; R=H, CH$_2$CH$_3$.

VdF unit/TFE unit/formula(1) unit=59.2/37.0/3.8 (molar ratio)

A polymer solution was prepared by mixing 2.2% by weight of the obtained fluoropolymer (A), 15.8% by weight of a vinylidene fluoride-tetrafluoroethylene copolymer (vinylidene fluoride/tetrafluoroethylene=80/20 (molar ratio)), and 82.0% by weight of dimethylformamide at 25° C. The polymer solution was applied on a glass plate with an applicator (203 μm). Immediately, the glass plate was immersed in a solidifying bath containing water at 25° C. and maintained for 5 hours to give a flat porous membrane. After sufficiently drying the porous membrane, the static water contact angle on the surface of the membrane was measured to be 83°.

Comparative Example 1

A polymer solution was prepared by mixing 18.0% by mass of a vinylidene fluoride-tetrafluoroethylene copolymer (vinylidene fluoride/tetrafluoroethylene=80/20 (molar ratio)), and 82.0% by mass of dimethylacetamide at 25° C. The polymer solution was applied on a glass plate with an applicator (203 μm). Immediately, the glass plate was immersed in a solidifying bath containing water at 25° C. and maintained for 5 hours to give a flat porous membrane. After sufficiently drying the porous membrane, the static water contact angle on the surface of the membrane was measured to be 100°.

Comparative Example 2

A polymer solution was prepared by mixing 18.0% by mass of a vinylidene fluoride-tetrafluoroethylene-hexafluoroethylene copolymer (vinylidene fluoride/tetrafluoroethylene/hexafluoroethylene=60/38/2 (molar ratio)), and 82.0% by mass of dimethylacetamide at 25° C. The polymer solution was applied on a glass plate with an applicator (203 μm). Immediately, the glass plate was immersed in a solidifying bath containing water at 25° C. and maintained for 5 hours to give a flat porous membrane. After sufficiently drying the porous membrane, the static water contact angle on the surface of the membrane was measured to be 109°.

Comparative Example 3

A polymer solution was prepared by mixing 18.0% by mass of polyvinylidene fluoride (product of Daikin Industries, Ltd.) and 82.0% by mass of dimethylacetamide at 25° C. The polymer solution was applied on a glass plate with an applicator (203 μm). Immediately, the glass plate was immersed in a solidifying bath containing water at 25° C. and maintained for 5 hours to give a flat porous membrane. After sufficiently drying the porous membrane, the static water contact angle on the surface of the membrane was measured to be 112°.

Example 3

A polymer solution was prepared by mixing 2.2% by weight of the fluoropolymer obtained in Example 2, 15.8% by weight of a vinylidene fluoride-tetrafluoroethylene copolymer (vinylidene fluoride/tetrafluoroethylene=80/20 (molar ratio)), 75.0% by weight of dimethylformamide, 2.2% by weight of Tween 40, and 4.7% by weight of water at 25° C.

The polymer solution was extruded from a double co-extrusion head together with deionized water serving as an internal fluid. The polymer solution was solidified in deionized water to give a hollow fiber membrane. The hollow fiber membrane had an outer diameter of 0.93 mm and an inner diameter of 0.70 mm; a pure water permeability coefficient at 25° C. of 5.8×10$^{-9}$ [m$^3$/m$^2$/Pa/s]; a 50-nm polystyrene particle filtration rate of not less than 98%; a maximum point breaking strength of 1.0 MPa; and a maximum point elongation of 160%.

The (O/F) ratio was 0.059, and the (C—F/C—H) ratio was 1.21 on the surface of the product measured by XPS.

The C—O bond content in a total of C—C bonds and bonds between C and an atom other than C was 2.52 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom or a C$_2$ alkyl group) was generated.

Example 4

A polymer solution was prepared by mixing 23% by weight of a vinylidene fluoride-tetrafluoroethylene copolymer (vinylidene fluoride/tetrafluoroethylene=80/20 (molar ratio)), 68% by weight of dimethylformamide, 6% by weight of water, and 3% by weight of Tween 40 at 25° C.

The polymer solution was extruded from a double co-extrusion head together with deionized water serving as an internal fluid, and solidified in deionized water to give a hollow fiber membrane-shaped product.

The hollow fiber membrane-shaped product had an outer diameter of 0.95 mm and an inner diameter of 0.79 mm.

An alkali treatment was performed on the porous hollow fiber membrane by immersing it in a 1N solution (alkali treatment solution) of NaOH in ethanol/water (50/50 volume %) for 24 hours. The resulting product had a pure water permeability coefficient of $1.9 \times 10^{-9}$ [$m^3/m^2/Pa/s$]; a 50-nm polystyrene particle filtration rate of not less than 98%; a maximum point breaking strength of 5.1 MPa; a maximum point elongation of 330%; a (O/F) ratio of 0.087, and a (C—F/C—H) ratio of 0.94.

The O—O bond content in a total of C—C bonds and bonds between C and an atom other than C was 2.95 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom or a $C_2$ alkyl group) was generated.

Comparative Example 4

A porous hollow fiber membrane was produced as in Example 4, except that no alkali treatment was performed.

The membrane had a pure water permeability coefficient at 25° C. of $7.3 \times 10^{-10}$ [$m^3/m^2/Pa/s$]; a 50-nm polystyrene particle filtration rate of not less than 98%; a maximum point breaking strength of 3.2 MPa; and a maximum point elongation of 410%.

The surface of the product had a ratio of oxygen/fluorine content (O/F) of 0.044, and a (C—F/C—H) ratio representing a ratio of C—F bonds to C—H bonds of 1.28, when measured by XPS. The C—O bond content in a total of C—C bonds and bonds between C and an atom other than C was not more than 0.70 mol %.

Examples 5-1 to 5-4

A polymer solution was prepared by mixing 18.0% by weight of a vinylidene fluoride-tetrafluoroethylene copolymer (vinylidene fluoride/tetrafluoroethylene=80/20 (molar ratio)), 79.6% by weight of dimethylformamide, and 2.4% by weight of Tween 40 at 25° C. The polymer solution was extruded from a double co-extrusion head together with deionized water serving as an internal fluid, and solidified in deionized water. A resulting hollow fiber membrane had an outer diameter of 1.02 mm and an inner diameter of 0.79 mm.

Next, the porous hollow fiber membrane obtained through the above steps was subjected to an alkali treatment under the following conditions.

Example 5-1

The membrane was immersed in a 1N solution (alkali treatment solution) of NaOH in ethanol/water (50/50 volume %) for 24 hours.

Example 5-2

The membrane was immersed in a 1N solution (alkali treatment solution) of NaOH in ethanol/water (50/50 volume %) for 48 hours.

Example 5-3

The membrane was immersed in a 1N aqueous NaOH solution (alkali treatment solution) for 48 hours.

Example 5-4

The membrane was immersed in a 1N solution (alkali treatment solution) of NaOH in isopropanol/water (50/50 volume %) for 48 hours.

The physical properties of the resulting porous hollow fiber membranes were as follows.

Example 5-1

The membrane had a pure water permeability coefficient of $3.8 \times 10^{-10}$ [$m^3/m^2/Pa/s$]; a 50-nm polystyrene particle filtration rate of not less than 98%; a maximum point breaking strength of 1.3 MPa; a maximum point elongation of 350%; a (O/F) ratio of 0.060; and a (C—F/C—H) ratio of 1.05.

The O—O bond content in a total of C—C bonds and bonds between C and an atom other than C was 2.00 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom or a $C_2$ alkyl group) was generated.

Example 5-2

The membrane had a pure water permeability coefficient of $4.1 \times 10^{-10}$ [$m^3/m^2/Pa/s$]; a 50-nm polystyrene particle filtration rate of not less than 98%; a (O/F) ratio of 0.105; and a (C—F/C—H) ratio of 0.80.

The O—O bond content in a total of C—C bonds and bonds between C and an atom other than C was 5.46 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom or a $C_2$ alkyl group) was generated.

Example 5-3

The membrane had a pure water permeability coefficient of $2.9 \times 10^{-10}$ [$m^3/m^2/Pa/s$]; a 50-nm polystyrene particle filtration rate of not less than 98%; a (O/F) ratio of 0.099; and a (C—F/C—H) ratio of 0.88.

The C—O bond content in a total of C—C bonds and bonds between C and an atom other than C was 1.54 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom) was generated.

Example 5-4

The membrane had a pure water permeability coefficient of $2.8 \times 10^{-10}$ [$m^3/m^2/Pa/s$]; a 50-nm polystyrene particle filtration rate of not less than 98%; a (O/F) ratio of 0.061; and a (C—F/C—H) ratio of 1.08.

The C—O bond content in a total of C—C bonds and bonds between C and an atom other than C was 2.60 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom or a $C_3$ alkyl group) was generated.

No degradation was found in the membranes of Examples 5-1 to 5-4.

Comparative Example 5

A porous hollow fiber membrane was produced as in Example 5, except that no alkali treatment was performed.

The membrane had a pure water permeability coefficient at 25° C. of $2.6 \times 10^{-10}$ [$m^3/m^2/pa/s$]; a 50-nm polystyrene particle filtration rate of not less than 98%; a maximum point breaking strength of 1.4 MPa; and a maximum point elongation of 410%.

The surface of the product had a ratio of oxygen/fluorine content (O/F) of 0.044, and a (C—F/C—H) ratio representing a ratio of C—F bonds to C—H bonds of 1.20, when measured by XPS. The C—O bond content in a total of C—C bonds and bonds between C and an atom other than C was not more than 0.70 mol %.

Examples 6-1 to 6-3

A polymer solution was prepared by mixing 18.0% by weight of a vinylidene fluoride-tetrafluoroethylene copolymer (vinylidene fluoride/tetrafluoroethylene=63/37 (molar ratio)), 79.6% by weight of dimethylformamide, and 2.4% by weight of Tween 40 at 25° C. The polymer solution was extruded from a double co-extrusion head together with deionized water serving as an internal fluid, and solidified in deionized water to give a hollow fiber membrane-shaped product.

The hollow fiber membrane-shaped product had an outer diameter of 0.94 mm and an inner diameter of 0.75 mm.

Next, the porous hollow fiber membrane obtained through the above steps was subjected to an alkali treatment under the following conditions.

Example 6-1

The membrane was immersed in a 1N solution (alkali treatment solution) of NaOH in ethanol/water (50/50 volume %) for 24 hours.

Example 6-2

The membrane was immersed in a 1N solution (alkali treatment solution) of NaOH in ethanol/water (50/50 volume %) for 48 hours.

Example 6-3

The membrane was immersed in a 1N aqueous NaOH solution (alkali treatment solution) for 48 hours.

The physical properties of the resulting porous hollow fiber membranes were as follows.

Example 6-1

The membrane had a pure water permeability coefficient of $5.8 \times 10^{-9}$ [$m^3/m^2/Pa/s$]; a 50-nm polystyrene particle filtration rate of not less than 98%; a maximum point breaking strength of 1.1 MPa; a maximum point elongation of 320%; a (O/F) ratio of 0.092; and a (C—F/C—H) ratio of 0.54.

The C—O bond content in a total of C—C bonds and bonds between C and an atom other than C was 3.43 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom or a $C_2$ alkyl group) was generated.

Example 6-2

The membrane had a pure water permeability coefficient of $9.2 \times 10^{-9}$ [$m^3/m^2/Pa/s$]; a 50-nm polystyrene particle filtration rate of not less than 98%; a (O/F) ratio of 0.118; and a (C—F/C—H) ratio of 0.67.

The C—O bond content in a total of C—C bonds and bonds between C and an atom other than C was 3.79 mold. Also, a unit represented by the formula: —$CHX^1$—$CX^2(OR)$— (wherein one of $X^1$ and $X^2$ is a hydrogen atom, and the other is a fluorine atom; and R is a hydrogen atom or a $C_2$ alkyl group) was generated.

Example 6-3

The membrane had a pure water permeability coefficient of $5.0 \times 10^{-9}$ [$m^3/m^2/Pa/s$]; a 50-nm polystyrene particle filtration rate of not less than 98%; a (O/F) ratio of 0.094; and a (C—F/C—H) ratio of 0.98.

The O—O bond content in a total of C—C bonds and bonds between C and an atom other than C was 3.70 mol %. Also, a unit represented by the formula: —$CHX^1$—$CX^2(OR)$— (wherein one of $X^1$ and $X^2$ is a hydrogen atom, and the other is a fluorine atom; and R is a hydrogen atom) was generated.

The hollow fiber membranes obtained in Examples 6-1 to 6-3 were only slightly tinted, showed very little change in color, and showed no degradation.

Comparative Example 6

A porous hollow fiber membrane was produced as in Example 6, except that no alkali treatment was performed.

The membrane had a pure water permeability coefficient at 25° C. of $2.0 \times 10^{-9}$ [$m^3/m^2/Pa/s$]; a 50-nm polystyrene particle filtration rate of not less than 98%; a maximum point breaking strength of 1.2 MPa; and a maximum point elongation of 340%. The surface of the product had a (O/F) ratio of 0.033, and a (C—F/C—H) ratio of 1.72, when measured by XPS. The C—O bond content in a total of C—C bonds and bonds between C and an atom other than C was not more than 0.70 mol %.

Comparative Examples 7-1 to 7-4

A polymer solution was prepared by mixing 18% by weight of polyvinylidene fluoride (product of Daikin Industries, Ltd.), 79.6% by weight of dimethylformamide, and 2.4% by weight of Tween 40 at 25° C.

The polymer solution was extruded from a double co-extrusion head together with deionized water serving as an internal fluid, and solidified in deionized water to give a hollow fiber membrane-shaped product.

The hollow fiber membrane-shaped product had an outer diameter of 1.03 mm and an inner diameter of 0.82 mm; a pure water permeability coefficient at 25° C. of $8.0 \times 10^{-10}$ [$m^3/m^2/Pa/s$]; a 50-nm polystyrene particle filtration rate of not less than 98%; a maximum point breaking strength of 2.0 MPa; and a maximum point elongation of 130%.

The surface of the product had a (O/F) ratio of 0.035, and a (C—F/C—H) ratio of 1.01, when measured by XPS.

Next, the porous hollow fiber membrane obtained through the above steps was subjected to an alkali treatment under the following conditions.

Comparative Example 7-1

The membrane was immersed in a 1N solution (alkali treatment solution) of NaOH in ethanol/water (50/50 volume %) for 24 hours.

Comparative Example 7-2

The membrane was immersed in a 1N solution (alkali treatment solution) of NaOH in ethanol/water (50/50 volume %) for 48 hours.

Comparative Example 7-3

The membrane was immersed in a 1N aqueous NaOH solution (alkali treatment solution) for 48 hours.

Comparative Example 7-4

The membrane was immersed in a 1N solution (alkali treatment solution) of NaOH in isopropanol/water (50/50 volume %) for 48 hours.

The physical properties of the resulting porous hollow fiber membranes were as follows.

Comparative Example 7-1

The membrane had a pure water permeability coefficient of $8.9 \times 10^{-10}$ [$m^3/m^2/Pa/s$]; a 50-nm polystyrene particle filtration rate of not less than 98%; a maximum point breaking strength of 1.8 MPa; a maximum point elongation of 98%; a (O/F) ratio of 0.079; and a (C—F/C—H) ratio of 0.67.

Comparative Example 7-2

The membrane had a pure water permeability coefficient of $1.1 \times 10^{-9}$ [$m^3/m^2/Pa/s$]; a 50-nm polystyrene particle filtration rate of not less than 98%; a (O/F) ratio of 0.125; and a (C—F/C—H) ratio of 0.51.

Comparative Example 7-3

The membrane had a pure water permeability coefficient of $9.7 \times 10^{-10}$ [$m^3/m^2/Pa/s$]; a 50-nm polystyrene particle filtration rate of not less than 98%; a (O/F) ratio of 0.100; and a (C—F/C—H) ratio of 0.65.

Comparative Example 7-4

The membrane had a pure water permeability coefficient of $9.8 \times 10^{-10}$ [$m^3/m^2/Pa/s$]; a 50-nm polystyrene particle filtration rate of not less than 98%; a (O/F) ratio of 0.083; and a (C—F/C—H) ratio of 0.77.

The membranes in Comparative Examples 7-1 to 7-4 started turning brown about 5 minutes after the beginning of the alkali treatment, and the porous hollow fiber membranes obtained were dark brown. In particular, the membrane obtained in Comparative Example 7-2 was degraded very badly.

Comparative Examples 8-1 to 8-2

A polymer solution was prepared by mixing 18.0% by weight of polyvinylidene fluoride (KF1100), 79.6% by weight of dimethylformamide, and 2.4% by weight of Tween 40 at 25° C. The polymer solution was extruded from a double co-extrusion head together with deionized water serving as an internal fluid, and solidified in deionized water. A resulting hollow fiber membrane had an outer diameter of 0.89 mm and an inner diameter of 0.72 mm; a pure water permeability coefficient at 25° C. of $7.7 \times 10^{-10}$ [$m^3/m^2/Pa/s$]; a 50-nm polystyrene particle filtration rate of not less than 98%; a maximum point breaking strength of 2.7 MPa; and a maximum point elongation of 120%.

Next, the porous hollow fiber membrane obtained through the above steps was subjected to an alkali treatment under the following conditions.

Comparative Example 8-1

The membrane was immersed in a 1N solution (alkali treatment solution) of NaOH in ethanol/water (50/50 volume %) for 30 minutes.

Comparative Example 8-2

The membrane was immersed in a 1N solution (alkali treatment solution) of NaOH in ethanol/water (50/50 volume %) for 4.5 hours.

The physical properties of the resulting hollow fiber membranes were as follows.

Comparative Example 8-1

The membrane had a pure water permeability coefficient of $6.7 \times 10^{-10}$ [$m^3/m^2/Pa/s$]; a 50-nm polystyrene particle filtration rate of not less than 98%; a maximum point breaking strength of 2.2 MPa; and a maximum point elongation of 120%.

Comparative Example 8-2

The membrane had a pure water permeability coefficient of $6.5 \times 10^{-10}$ [$m^3/m^2/Pa/s$]; a 50-nm polystyrene particle filtration rate of not less than 98%; a maximum point breaking strength of 2.3 MPa; and a maximum point elongation of 110%.

The membranes in Comparative Examples 8-1 and 8-2 started turning brown about 5 minutes after the beginning of the alkali treatment. The porous hollow fiber membrane obtained in Comparative Example 8-2 was dark brown.

Examples 7-1 to 7-3

A polymer solution similar to the one in Example 5 was applied on a glass plate with an applicator (203 μm). Immediately, the glass plate was immersed in a solidifying bath containing water at 25° C. and maintained for 5 hours to give a flat porous membrane. The porous membrane had a (O/F) ratio of 0.044 and a (C—F/C—H) ratio of 1.28. The C—O bond content in a total of C—C bonds and bonds between C and an atom other than C was not more than 0.70 mol %.

Next, the flat porous membrane obtained through the above steps was subjected to an alkali treatment under the following conditions.

Example 7-1

The membrane was immersed in a 1N solution (alkali treatment solution) of NaOH in ethanol/water (50/50 volume %) for 10 days.

Example 7-2

The membrane was immersed in a 1N aqueous NaOH solution (alkali treatment solution) for 10 days.

Example 7-3

The membrane was immersed in a 1N solution (alkali treatment solution) of NaOH in isopropanol/water (50/50 volume %) for 10 days.

The physical properties of the resulting flat porous membranes were as follows.

Example 7-1

The membrane had a (O/F) ratio of 0.081, and a (C—F/C—H) ratio of 0.98.

The C—O bond content in a total of C—C bonds and bonds between C and an atom other than C was 4.12 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom or a C$_2$ alkyl group) was generated.

Example 7-2

The membrane had a (O/F) ratio of 0.128, and a (C—F/C—H) ratio of 0.85.

The C—O bond content in a total of C—C bonds and bonds between C and an atom other than C was 4.03 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom) was generated.

Example 7-3

The membrane had a (O/F) ratio of 0.086, and a (C—F/C—H) ratio of 1.02.

The C—O bond content in a total of C—C bonds and bonds between C and an atom other than C was 2.57 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom or a C$_3$ alkyl group) was generated.

The flat porous membranes obtained in Example 7-1 to 7-3 were slightly tinted light brown, but were not degraded to be crumbled.

Examples 8-1 to 8-3

A polymer solution similar to the one in Example 6 was applied on a glass plate with an applicator (203 µm). Immediately, the glass plate was immersed in a solidifying bath containing water at 25° C. and maintained for 5 hours to give a flat porous membrane. The porous membrane had a (O/F) ratio of 0.049 and a (C—F/C—H) ratio of 1.44. The C—O bond content in a total of C—C bonds and bonds between C and an atom other than C was not more than 0.70 mol %.

Next, the flat porous membrane obtained through the above steps was subjected to an alkali treatment under the following conditions.

Example 8-1

The membrane was immersed in a 1N solution (alkali treatment solution) of NaOH in ethanol/water (50/50 volume %) for 8 days.

Example 8-2

The membrane was immersed in a 1N aqueous NaOH solution (alkali treatment solution) for 8 days.

Example 8-3

The membrane was immersed in a 1N solution (alkali treatment solution) of NaOH in isopropanol/water (50/50 volume %) for 8 days.

The physical properties of the resulting flat porous membranes were as follows.

Example 8-1

The membrane had a (O/F) ratio of 0.148, and a (C—F/C—H) ratio of 0.71.

The C—O bond content in a total of C—C bonds and bonds between C and an atom other than C was 4.32 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom or a C$_2$ alkyl group) was generated.

Example 8-2

The membrane had a (O/F) ratio of 0.128, and a (C—F/C—H) ratio of 0.79.

The C—O bond content in a total of C—C bonds and bonds between C and an atom other than C was 2.92 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom) was generated.

Example 8-3

The membrane had a (O/F) ratio of 0.090, and a (C—F/C—H) ratio of 1.27.

The C—O bond content in a total of C—C bonds and bonds between C and an atom other than C was 5.82 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom or a C$_3$ alkyl group) was generated.

The flat porous membranes obtained in Example 8-1 to 8-3 were slightly tinted light brown, but were not degraded to be crumbled.

Comparative Example 9-1 to 9-3

A polymer solution similar to the one in Comparative Example 7 was applied on a glass plate with an applicator (203 µm). Immediately, the glass plate was immersed in a solidifying bath containing water at 25° C. and maintained for 5 hours to give a flat porous membrane. The porous membrane had a (O/F) ratio of 0.035 and a (C—F/C—H) ratio of 1.01.

Next, the flat porous membrane obtained through the above steps was subjected to an alkali treatment under the following conditions.

Comparative Example 9-1

The membrane was immersed in a 1N solution (alkali treatment solution) of NaOH in ethanol/water (50/50 volume %) for 7 days.

Comparative Example 9-2

The membrane was immersed in a 1N aqueous NaOH solution (alkali treatment solution) for 7 days.

Comparative Example 9-3

The membrane was immersed in a 1N solution (alkali treatment solution) of NaOH in isopropanol/water (50/50 volume %) for 7 days.

The physical properties of the resulting flat porous membranes were as follows.

Comparative Example 9-1

The membrane had a (O/F) ratio of 0.155, and a (C—F/C—H) ratio of 0.57.

Comparative Example 9-2

The membrane had a (O/F) ratio of 0.247, and a (C—F/C—H) ratio of 0.24.

Comparative Example 9-2

The membrane had a (O/F) ratio of 0.059, and a (C—F/C—H) ratio of 0.79.

The flat porous membranes obtained in Comparative Examples 9-1 to 9-3 were colored blackish brown. In particular, the membranes obtained in Comparative Examples 9-1 and 9-2 were degraded so badly that they were crumbled when picked up with forceps.

INDUSTRIAL APPLICABILITY

The novel fluoropolymer of the present invention can be used for various applications. For example, it can be used as a material for porous polymer membranes or the like.

The invention claimed is:

1. A fluoropolymer comprising a vinylidene fluoride unit, a tetrafluoroethylene unit, and a unit represented by the following formula (1):

$$—CHX^1—CX^2(OR)— \quad (1)$$

wherein one of $X^1$ and $X^2$ is a hydrogen atom, and the other is a fluorine atom; and R is a hydrogen atom or a $C_1$-$C_8$ alkyl group.

2. The fluoropolymer according to claim 1,
    wherein the R in the formula (1) is a hydrogen atom, a methyl group, or an ethyl group.

3. The fluoropolymer according to claim 1,
    wherein the fluoropolymer has a surface that has a ratio of oxygen/fluorine content (O/F) on the surface of not less than 0.050 but less than 0.150 when measured by X-ray photoelectron spectroscopy (XPS).

4. The fluoropolymer according to claim 1,
    wherein the fluoropolymer has a surface that has a (C—F/C—H) ratio representing a ratio of C—F bonds to C—H bonds on the surface of larger than 0.50 when measured by X-ray photoelectron spectroscopy (XPS).

5. A method of producing the fluoropolymer according to claim 1, comprising a step of treating a fluoropolymer that includes a vinylidene fluoride unit and a tetrafluoroethylene unit with an alkali in the presence of water and/or a $C_1$-$C_8$ alcohol.

6. The method of producing the fluoropolymer according to claim 5,
    wherein the alcohol is ethanol or methanol.

7. The method of producing the fluoropolymer according to claim 5,
    wherein the fluoropolymer includes the vinylidene fluoride unit and the tetrafluoroethylene unit in a molar ratio of the vinylidene fluoride unit/tetrafluoroethylene unit of 50 to 90/50 to 10.

8. A porous polymer membrane comprising the fluoropolymer according to claim 1.

* * * * *